US007310446B2

(12) United States Patent
Kato et al.

(10) Patent No.: US 7,310,446 B2
(45) Date of Patent: Dec. 18, 2007

(54) RECOGNITION DEVICE AND METHOD

(75) Inventors: Noriji Kato, Ashigarakami-gun (JP); Hirotsugu Kashimura, Ashigarakami-gun (JP); Hitoshi Ikeda, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 666 days.

(21) Appl. No.: 10/382,644

(22) Filed: Mar. 7, 2003

(65) Prior Publication Data
US 2003/0179933 A1 Sep. 25, 2003

(30) Foreign Application Priority Data
Mar. 20, 2002 (JP) .............................. 2002-078774

(51) Int. Cl.
  *G06K 9/68* (2006.01)
  *G06K 9/00* (2006.01)
  *G06K 9/48* (2006.01)
(52) U.S. Cl. .................... 382/218; 382/156; 382/203
(58) Field of Classification Search ................ 382/218, 382/277, 156, 203
See application file for complete search history.

(56) References Cited

U.S. PATENT DOCUMENTS

| 3,732,366 | A | * | 5/1973 | Bolie | 382/218 |
| 4,641,350 | A | * | 2/1987 | Bunn | 382/124 |
| 4,701,961 | A | * | 10/1987 | Hongo | 382/218 |
| 5,204,944 | A | * | 4/1993 | Wolberg et al. | 345/427 |
| 5,469,512 | A | * | 11/1995 | Fujita et al. | 382/118 |
| 5,745,873 | A | * | 4/1998 | Braida et al. | 704/222 |
| 6,301,388 | B1 | * | 10/2001 | Hiramoto | 382/218 |
| 6,728,404 | B1 | * | 4/2004 | Ono et al. | 382/190 |
| 6,785,419 | B1 | * | 8/2004 | Jojic et al. | 382/197 |
| 6,973,204 | B2 | * | 12/2005 | Adachi | 382/119 |
| 2001/0048757 | A1 | * | 12/2001 | Oosawa | 382/130 |
| 2002/0097901 | A1 | * | 7/2002 | Xu et al. | 382/131 |

FOREIGN PATENT DOCUMENTS

JP    A 11-272801    10/1999

OTHER PUBLICATIONS

Rowley et al., "Rotation Invariant Neural Network-Based Face Detection", Proceedings of IEEE Conference on Computer Vision and Pattern Recognition, 1998, pp. 38-44.

* cited by examiner

*Primary Examiner*—Bhavesh M Mehta
*Assistant Examiner*—Kathleen Yuan
(74) *Attorney, Agent, or Firm*—Oliff & Berridge, PLC

(57) ABSTRACT

A recognition device which judges whether a target is identical with a predetermined reference, comprising: a holding unit which holds the target; multiple deformation units which deform the target held by the holding unit with at least one degree of flexibility in deformation; multiple deformed amount estimation units which correspond to the deformation units in a one-to-one relationship and estimate a deformed amount of the target from the reference with respect to the flexibility in deformation according to the corresponding deformation unit; an estimated error evaluation unit which evaluates an estimated error of the deformed amount estimated by the deformed amount estimation unit; an adjustment unit which operates any of the deformation units with precedence according to the estimated error evaluated by the estimated error evaluation unit; a similarity calculation unit which calculates a similarity between the reference and the target which is deformed by the deformation unit operated with precedence by the adjustment unit; and a judgment unit which judges whether the target is identical with the reference according to the similarity calculated by the similarity calculation unit.

20 Claims, 11 Drawing Sheets

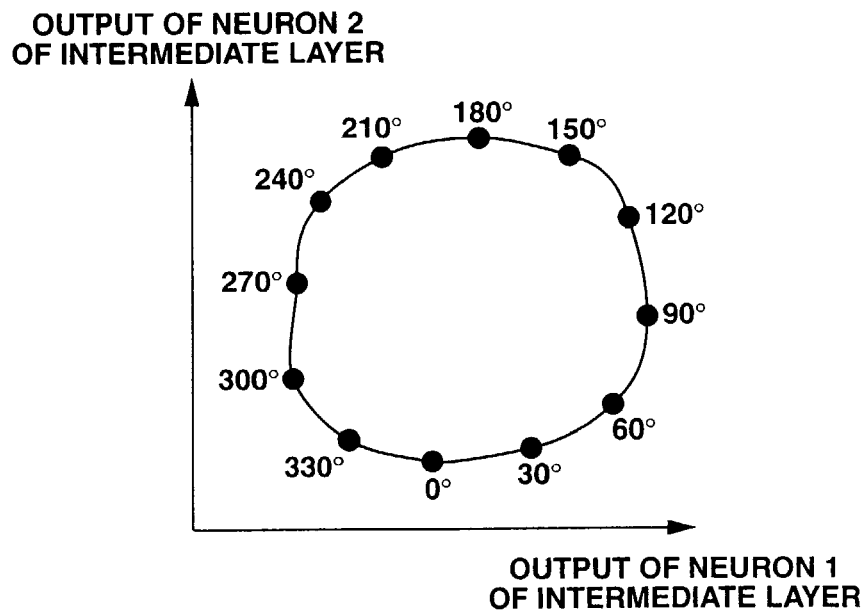
FIG.5
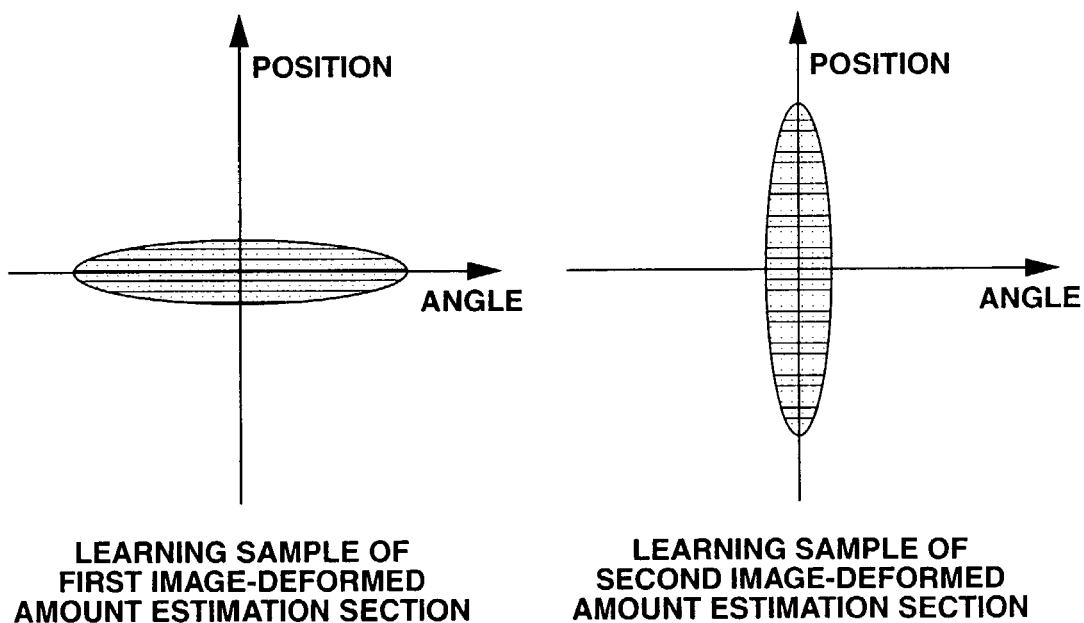
LEARNING SAMPLE OF
FIRST IMAGE-DEFORMED
AMOUNT ESTIMATION SECTION
FIG.6A
LEARNING SAMPLE OF
SECOND IMAGE-DEFORMED
AMOUNT ESTIMATION SECTION
FIG.6B

RECOGNITION DEVICE AND METHOD

BACKGROUND OF THE INVENTION

1. Field of the Invention

The present invention relates to a recognition device and method, and more particularly a recognition device and method which performs a computation on a target such as an image or voice to recognize whether it matches a predetermined reference.

2. Description of the Related Art

For recognition of a recognition target such as a substance or the face of a person with reference to its image, it can be recognized in principle by calculating a similarity of the input image of a substance with a template image of a previously stored reference.

But, the image of an actual recognition target is largely variable depending on environmental conditions such as a direction of the placed recognition target, a distance and lighting. Therefore, an enormous quantity of templates corresponding to image variations must be prepared. And, a computational quantity required for calculation of the similarity between the input image and the templates also becomes enormous.

Therefore, a method, which normalizes the input image to a position, inclination, size and the like predetermined by geometrical transformation or the like, is effective. Normalization allows the reduction of template images to be compared and the recognition processing in actual computing time.

As a normalization method, there is a known method which extracts feature points from the input image and applies the extracted feature points to a shape model of a prescribed normalization image so to normalize the input image. As a typical feature point extraction method, a method using an edge operator is known, but a clear edge may not be obtained when a substance has a smooth surface shape such as a face, and an edge is greatly susceptible to lighting conditions.

Meanwhile, a scholarly treatise "Rotation Invariant Neural Network-Based Face Detection" (H. A. Rowley, S. Baluja and T. Kanade, Proceedings of IEEE Conference on Computer Vision and Pattern Recognition, 1998, pp. 38-44) discloses a technique to detect a deviation from a normalized image directly from a light and dark pattern of an input image and uses the detected value to normalize the input image. According to the treatise, a tilted angle of the face is detected from a tilted face image by a neural net, the tilted angle detected is used to make the face image upright, and it is recognized whether the input image is a face image. This method can estimate an angle with resistant to a change in the input image by virtue of generalization ability of the neural net, and a normalized image can be obtained stably.

But, the technique described in the above treatise needs to accurately estimate the lean angle with respect to all angles. Therefore, it is necessary to learn all angles to a learning sample, and there are disadvantages that it is necessary to prepare a lot of learning samples and learning takes a long time.

Besides, the above treatise covers rotation in only an image surface as flexibility of deformation of an input image, but an actual image has a high degree of flexibility in a rotation in a depth direction, a size, a position, lighting and the like, resulting in a more serious problem.

In other words, learning samples varied independent of respective flexibility are required in order to accurately estimate a lot of flexibility at the same time, and an enormous quantity of learning samples is required as the product of the number of samples required for respective flexibility. Accordingly, it is impossible to complete learning in a realistic time.

Under the circumstances described above, the present invention provides a recognition device and method which can normalize the target such as an image or voice even if the target varies largely and can learn with ease.

SUMMARY OF THE INVENTION

The present invention has been made in view of the above circumstances, and an aspect of the present invention is a recognition device which judges whether a target is identical with a predetermined reference, comprising: a holding unit which holds the target; multiple deformation units which deform the target held by the holding unit with at least one degree of flexibility in deformation; multiple deformed amount estimation units which correspond to the deformation units in a one-to-one relationship and estimate a deformed amount of the target from the reference with respect to the flexibility in deformation according to the corresponding deformation unit; an estimated error evaluation unit which evaluates an estimated error of the deformed amount estimated by the deformed amount estimation unit; an adjustment unit which operates any of the deformation units with precedence according to the estimated error evaluated by the estimated error evaluation unit; a similarity calculation unit which calculates a similarity between the reference and the target which is deformed by the deformation unit operated with precedence by the adjustment unit; and a judgment unit which judges whether the target is identical with the reference according to the similarity calculated by the similarity calculation unit.

Another aspect of the present invention is a recognition method for determining whether a target is identical with a predetermined reference, comprising: estimating a deformed amount of the target from the reference according to multiple degrees of freedom for deformation; evaluating an estimated error of the estimated deformed amount; deforming the target with the degree of freedom for deformation having the evaluated estimated error at a minimum level; calculating a similarity between the deformed target and the reference; and judging whether the target is identical with the reference according to the calculated similarity.

According to the present invention, it is configured that the deformed amount of the target from the reference is estimated according to the multiple deformation flexibility, the estimated error of the estimated deformed amount is evaluated at the same time, the target is deformed with deformation flexibility having the minimum evaluated estimated error, a similarity between the deformed target and the reference is calculated, and it is judged whether the target is identical with the reference according to the calculated similarity. Therefore, even when the environment of the target changes largely, the image recognition device which can recognize the target can be realized with realistic resources, and learning can be made easily with less learning samples.

BRIEF DESCRIPTION OF THE DRAWINGS

FIG. 5 is a diagram showing a relationship between a projection value to a subspace and an image rotation angle;

FIG. 6A and FIG. 6B are diagrams showing distributions of learning samples;

DESCRIPTION OF THE PREFERRED EMBODIMENTS

Preferred embodiments of a recognition device and method according to the present invention will be described in detail with reference to the accompanying drawings.

Embodiment 1

Figure 1:
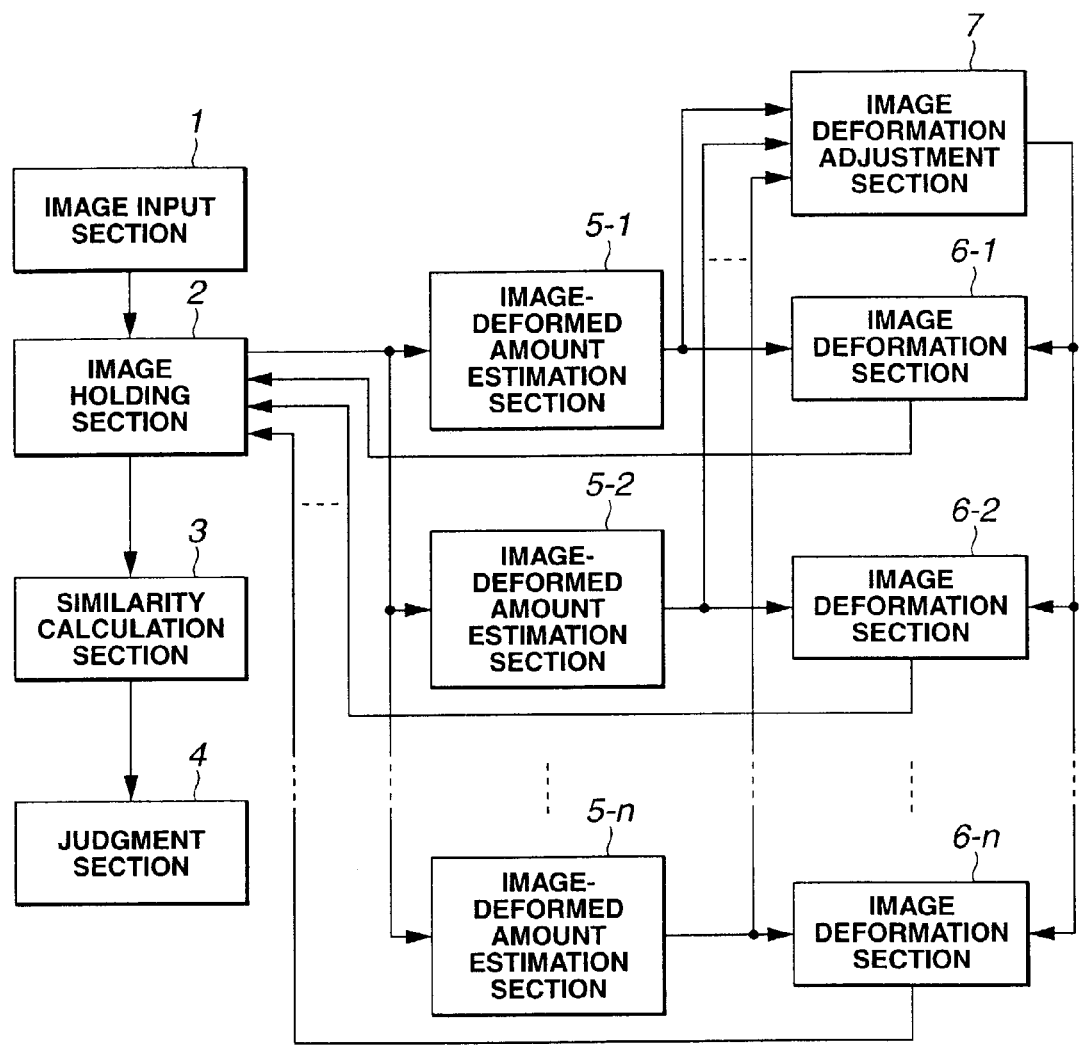
FIG. 1 is a block diagram showing a functional structure of a recognition device to which the present invention is applied.

FIG. 1 is a block diagram showing a functional structure of a recognition device to which the present invention is applied.

As shown in FIG. 1, the recognition device comprises an image input section 1, an image holding section 2, a similarity calculation section 3, a judgment section 4, multiple image-deformed amount estimation sections 5 (5-1 to 5-n), multiple image deformation sections 6 (6-1 to 6-n) and an image deformation adjustment section 7.

The image input section 1 inputs an image to be recognized and comprises, for example, a CCD camera.

The image holding section 2 holds the target image to be recognized input by the image input section 1. The image is held as a vector pattern which, for example, has luminance of each pixel of the image as a component and a dimension of the number of pixels. The held image is deformed appropriately by the image deformation section 6, and the deformed image is held again by the image holding section 2.

The similarity calculation section 3 calculates a similarity between the image held by the image holding section 2 and the template image of a reference designated in advance. The similarity can be indicated by a Euclid distance between an image held by the image holding section 2 and the template image, namely the square root of a sum of squares of a difference in luminance of corresponding pixels, a distance between an image held by the image holding section 2 and a subspace approximating the distribution of the multiple template images, and the like. For example, when it is assumed that inverse numbers of such distances indicate a similarity, the similarly becomes higher as such distances become smaller. And, the similarity calculation section 3 can also serve as an estimated error evaluation section 14 to be described later.

The judgment section 4 compares the similarity calculated by the similarity calculation section 3 with a predetermined threshold and determines that the target is identical with the reference when the similarity is larger than the threshold.

The image-deformed amount estimation sections 5 (5-1 to 5-n) respectively estimate a level of deformation of the image held by the image holding section 2 from the template image with respect to the flexibility of a different image deformation. The flexibility of image deformation includes, for example, positional displacement, rotation, enlargement/reduction and the like. The image-deformed amount estimation section 5 also evaluates precision of the estimated image deformation and outputs it.

The image deformation sections 6 (6-1 to 6-n) each correspond to the image-deformed amount estimation sections 5 (5-1 to 5-n) in a one-to-one relationship and deform the image held by the image holding section 2 to resemble the template image. Flexibility of the image deformation sections 6 for image deformation manipulation is the same as the image deformation flexibility of the corresponding image-deformed amount estimation sections 5, and a degree of deformation manipulation is determined according to an estimate of image-deformed amount and its precision from the corresponding image-deformed amount estimation sections 5. The degree of deformation manipulation is determined to be a value obtained by multiplying the estimate of image-deformed amount by a deceleration factor. It is configured that the deceleration factor is 1 when the estimate error is 0 and approaches 0 as the estimate error becomes larger. A direction of image deformation manipulation is determined to be a direction in that the image held by the image holding section 2 approaches the template. In other words, the smaller the estimated error is, the image held by the image holding section 2 approaches the template image by a less image operation.

The image deformation adjustment section 7 adjusts the image manipulation by each of the image deformation sections 6. The adjustment is made according to the estimate error of the estimate of image-deformed amount being sent from each of the image-deformed amount estimation sections 5, and the image deformation section 6 with the smallest value is operated with higher priority. But, the image deformation section 6 having the image deformation estimate of a prescribed value or below is not operated.

Figure 2:
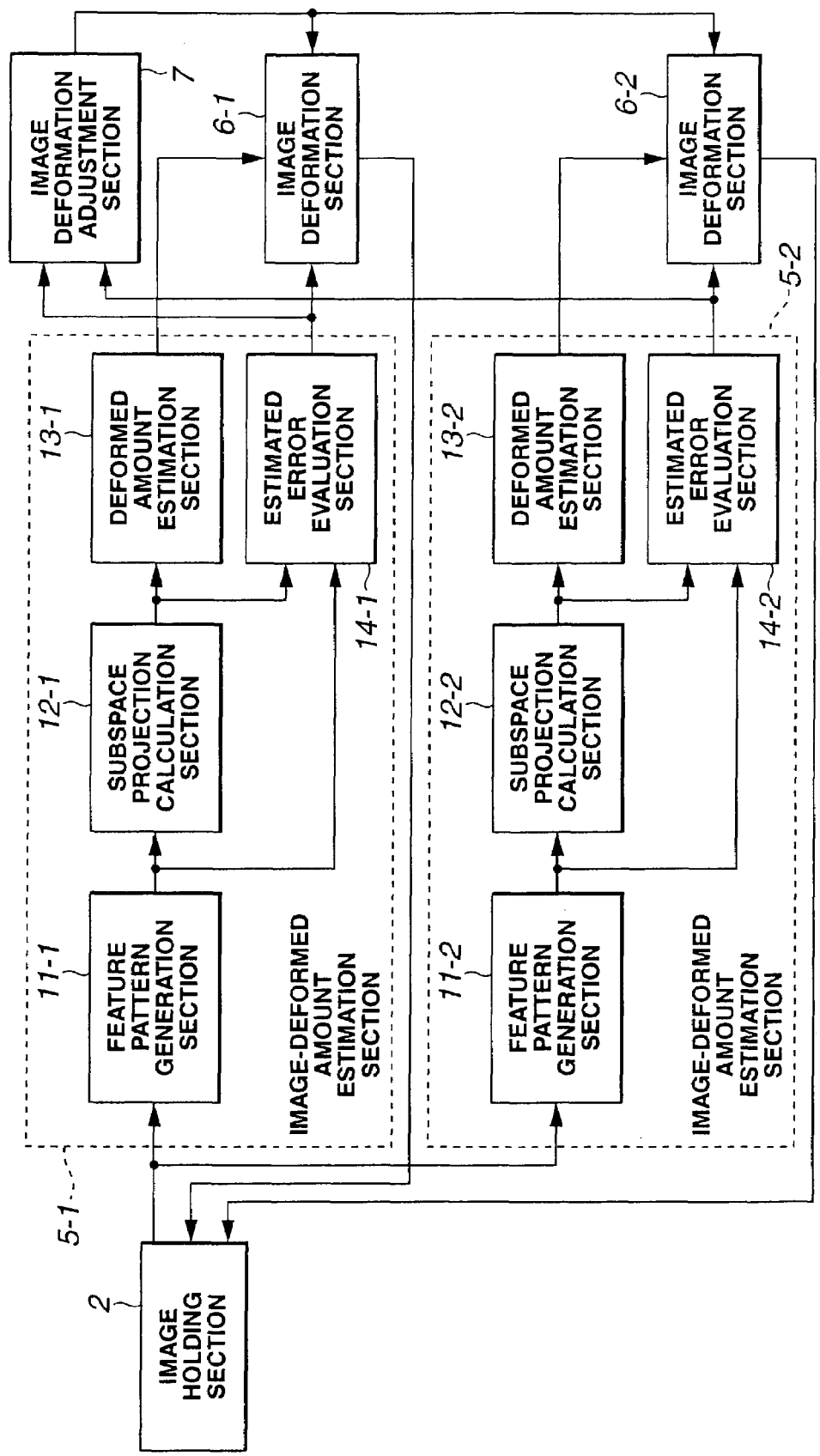
FIG. 2 is a diagram showing a structure of an image-deformed amount estimation section 5.

Then, a structure of the image-deformed amount estimation section 5 will be described in detail. FIG. 2 is a diagram showing the structure of the image-deformed amount estimation section 5. As shown in FIG. 2, the each image-deformed amount estimation section 5 comprises a feature pattern generation section 11, a subspace projection calculation section 12, a deformed amount estimation section 13, and an estimated error evaluation section 14.

The feature pattern generation section 11 generates a feature pattern by predetermined transformation from the vector pattern indicating the image input from the image holding section 2. This conversion method can be, for example, a method which projects a vector pattern to finite base vectors having a large characteristic value obtained by previously analyzing main components of desired multiple images, a method which performs Fourier transformation of a vector pattern, a method which performs wavelet transformation of a vector pattern, or the like.

The subspace projection calculation section 12 previously learns a subspace which approximates the distribution of a feature pattern of the reference image and, when the feature pattern of the target image is input, the feature pattern is projected to the subspace, and coordinate values of a coordinate system on the subspace of the projection are output. Here, the projection vector of the feature pattern to the subspace is determined to be a point on the subspace which is nearest to the feature pattern. Because a change of the feature pattern is very complex in a real world, a nonlinear subspace is preferable for approximation of the change.

Figure 3:
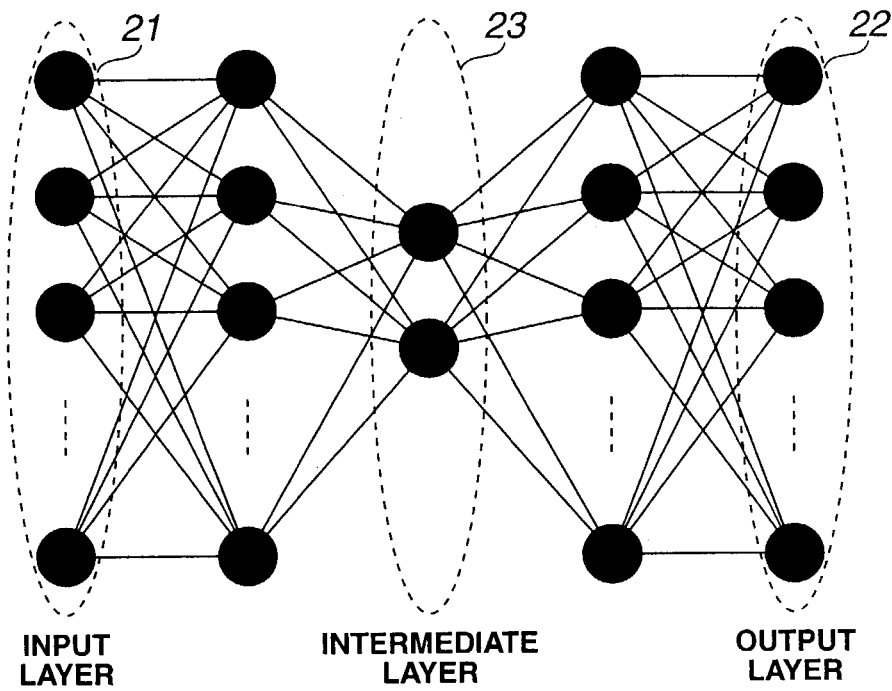
FIG. 3 is a diagram illustrating an auto-encoder.

The nonlinear subspace can be indicated by, for example, a neural net which is called an auto-encoder as shown in FIG. 3. The auto-encoder is a kind of multilayer perceptron, the number of neurons n of an input layer 21 is equal to the number of neurons n of an output layer 22 as shown in FIG. 3, and the number of neurons of an intermediate layer 23 is smaller than the number of neurons of the input layer 21. And, the same value as that input to the input layer 21 is given as a teacher signal to the neuron of the output layer 22, and a weight of synaptic connection is learned so to realize identical mapping. Learning can be made by an ordinary back-propagation method.

Figure 4:
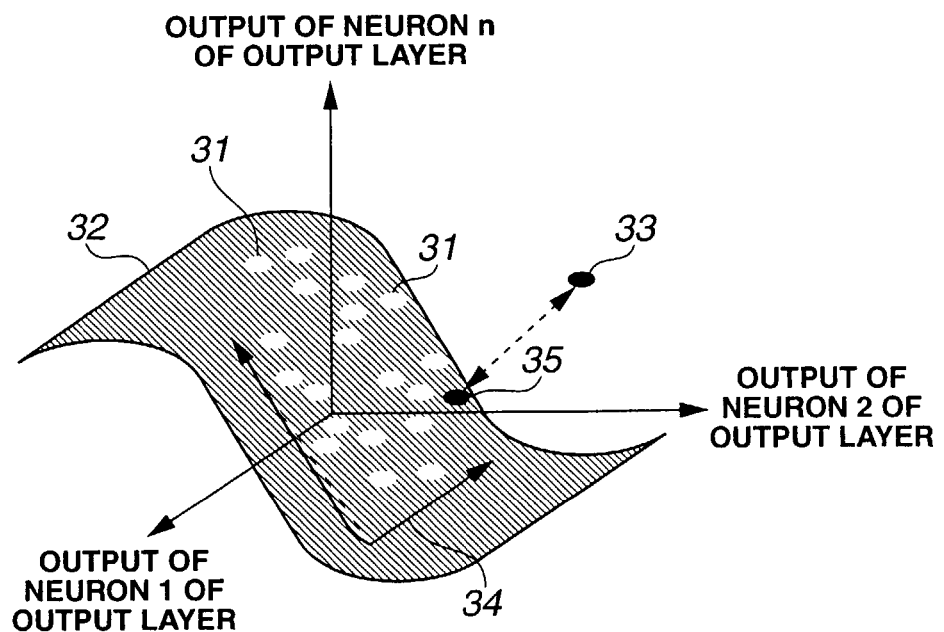
FIG. 4 is a diagram illustrating a nonlinear subspace.

As shown in FIG. 4, output of the output layer 22 of the learned auto-encoder configures a nonlinear subspace 32 which approximates the distribution of a learning sample 31 within an n-dimensional space indicating input, and output of neurons of the intermediate layer 23 of the auto-encoder corresponds to coordinate components of a coordinate system 34 on the nonlinear subspace 32. Therefore, output of the output layer 22 when a feature pattern 33 is input to the learned auto-encoder becomes projection 35 to the nonlinear subspace 32 of the feature pattern 33, and output of neurons of the intermediate layer 23 has its projection vector shown by the coordinate system on the nonlinear subspace 32.

The deformed amount estimation section 13 previously learns a relationship between the projection of a feature pattern, which is output from the subspace projection calculation section 12, to subspace and an image-deformed amount, uses it to determine an image-deformed amount from the projection value to the subspace and outputs it. The relationship between the projection to the subspace and the image-deformed amount becomes a relationship as shown in FIG. 5 when, for example, the subspace is indicated by the auto-encoder having the number of neurons 2 of the intermediate layer 23 and the flexibility is rotation.

FIG. 5 shows that output of two neurons of the intermediate layer 23 is plotted two-dimensionally, and its locus draws a closed curve according to a rotation angle of the image. Because the points on the closed curve and the rotation angles of the image are corresponded one by one, the rotation angles of the image can be estimated from the output of two neurons of the intermediate layer 23. The relationship between the output of neurons of the intermediate layer 23 and image-deformed amount is stored as an approximate function in the deformed amount estimation section 13 or stored as a lookup table in a memory (not shown).

The estimated error evaluation section 14 calculates a distance d between the feature pattern 33 and the nonlinear subspace 32 as shown in FIG. 4 and outputs the distance d as precision of an image-deformed amount estimated by the deformed amount estimation section 13. Here, the distance between the feature pattern 33 and the nonlinear subspace 32 is a Euclidean distance between the feature pattern 33 and the projection vector 35 onto its nonlinear subspace 32. For example, when the nonlinear subspace 32 is indicated by the auto-encoder, it can be indicated by a Euclidean distance between the input and output of the auto-encoder. The feature vector 33 can be regarded as approximated well by the nonlinear subspace 32 as the distance between the feature vector 33 and the nonlinear subspace 32 is smaller, so that it is appropriate to use d as precision of the image-deformed amount. It is to be understood that any monotone increasing function related to d can be used.

A learning sample to make the recognition device shown in FIG. 1 to learn will be described. It is to be understood that a recognition target is changed its inclination and position within a field of view of the observer but its distance from the observer is not changed to make it simple. Specifically, flexibility of deformation of an image of the recognition target is allowed to rotate in an image surface and to move in the image surface only for example. It is naturally possible to provide another flexibility.

Two image-deformed amount estimation sections 5 are provided to comply with flexibility of deformation of the image, a first image-deformed amount estimation section 5-1 serves to rotate within the image surface and a second image-deformed amount estimation section 5-2 serves to move within the image surface. Learning samples of the first image-deformed amount estimation section 5-1 are multiple erect images of a target positioned at the center of an observer's view and rotated and shifted at the same time. The rotation angle is variable with random numbers ranging, for example, from −180 degrees to 180 degrees, as shown in FIG. 6A and FIG. 6B, and the degree of shift is changed with random numbers in Gaussian distribution of, for example, a width of 6 pixels in vertical and horizontal directions as shown in FIG. 6A and FIG. 6B. The number of samples is, for example, 1000 images prepared.

Similarly, for the second image-deformed amount estimation section 5-2, multiple erect images of the target positioned at the center of the observer's view are prepared for the learning samples, the multiple images are rotated and shifted at the same time, and the rotation angle is varied with random numbers in Gaussian distribution of, for example, a width of 10 degrees as shown in FIG. 6A and FIG. 6B. And, the degree of shift is varied with uniform random numbers of, for example, from −6 pixels to 6 pixels in vertical and horizontal directions as shown in FIG. 6A and FIG. 6B. The number of samples is, for example, 1000 images prepared.

Figure 7:
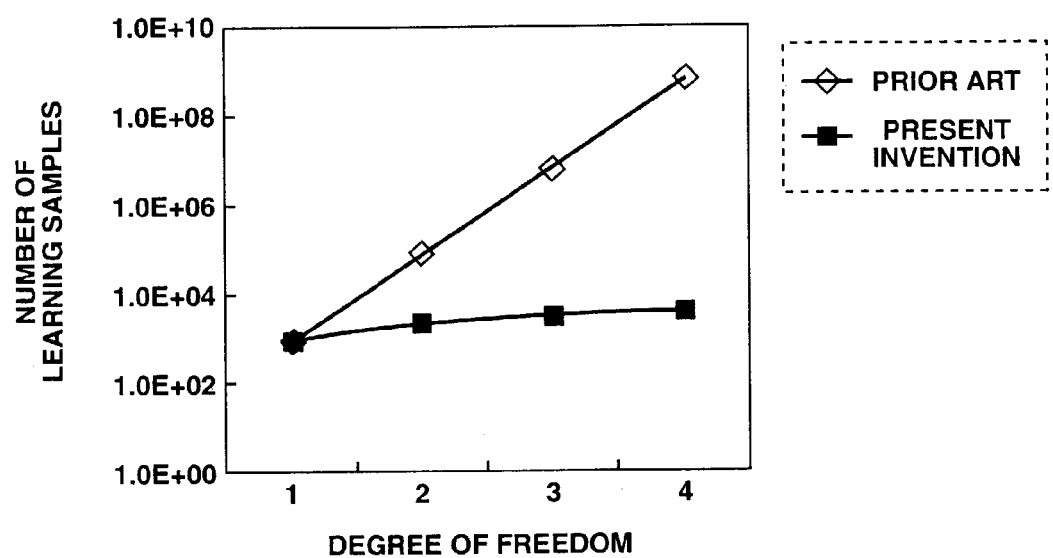
FIG. 7 is a diagram showing a comparison of the number of learning samples of Embodiment 1 and prior art.

As described above, according to the present invention, substantially the same number of learning samples may be prepared for the flexibility of image deformation to be recognized, and the number of learning samples is proportional to the flexibility of image deformation as shown in FIG. 7.

Meanwhile, because prior art needs to prepare a learning sample for all combinations of flexibility of image deformation to be recognized, the number of learning samples increases in series with respect to the flexibility of image deformation. Therefore, when the flexibility of image deformation increases particularly, the number of learning samples is less than in the prior art, and learning time becomes short according to the invention.

And, a resource to express a subspace for approximation of the distribution of the learning samples increases as the number of learning samples increases. For example, it is the number of neurons or synapses of the intermediate layer for the auto-encoder. Accordingly, calculation time for recognition also increases. Therefore, the present invention is also effective to reduce the resource and to decrease the recognition time.

Figure 8:
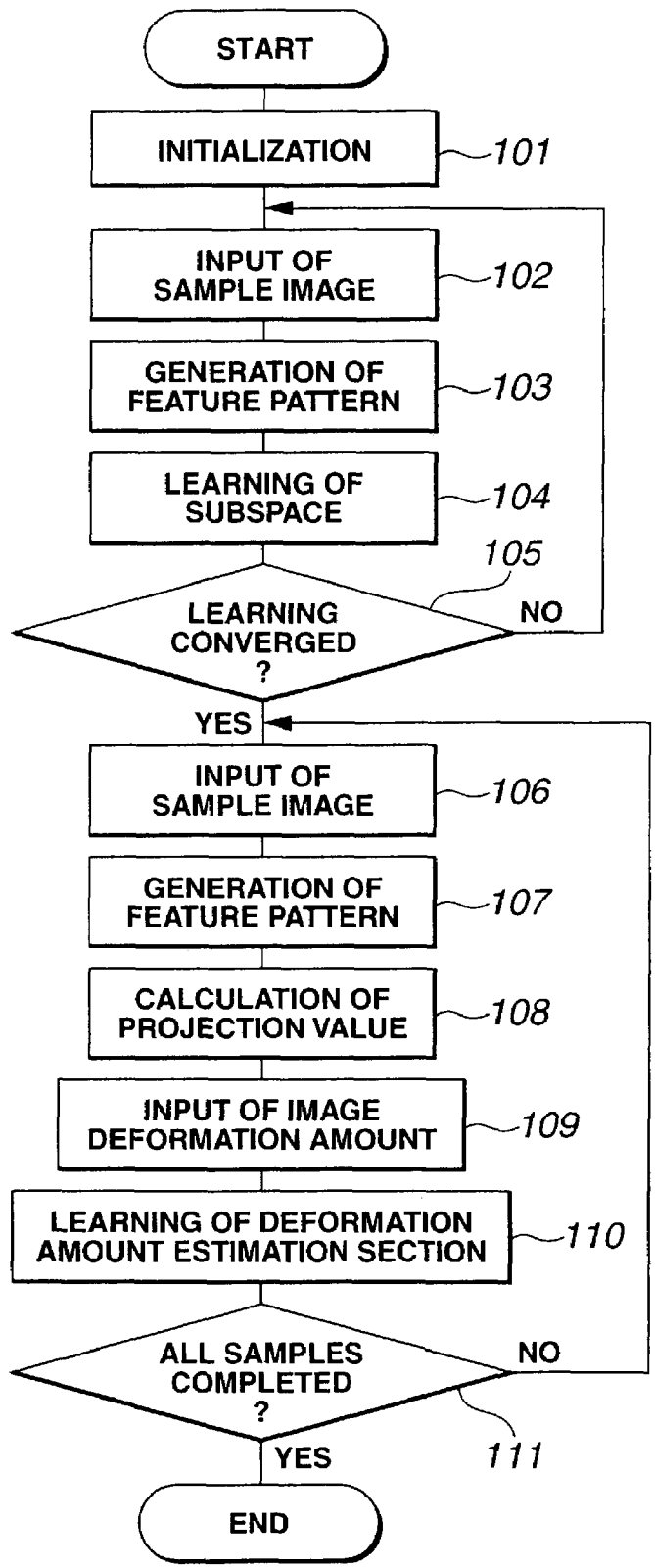
FIG. 8 is a flow chart showing a flow of an operation of a recognition device when it is learning.

Then, an operation of the recognition device shown in FIG. 1 when it learns will be described. FIG. 8 is a flow chart showing a flow of an operation when the recognition device learns.

Learning can be made independent of the first image-deformed amount estimation section 5-1 and the second image-deformed amount estimation section 5-2. Here, learning by the first image-deformed amount estimation section 5-1 will be described. Learning by the second image-deformed amount estimation section 5-2 is also made by the same procedure.

First, the auto-encoder of the first image-deformed amount estimation section 5-1 is initialized (step 101). Initialization sets the number of neurons of the input layer and the output layer to the number of dimensions of a feature pattern, the number of neurons of the third layer is set to 2 which indicates the flexibility of the image rotation. The number of neurons of the second layer and the fourth layer is set to the number of dimensions or more of a feature pattern. Besides, a weight of each synapse is initialized by random numbers.

Then, for example, a learning sample of 27×27 pixels is input to the image input section 1 and held in the form of a 729-dimensional vector, which has a luminance value of each pixel as a component, by the image holding section 2 (step 102). Subsequently, the image held by the image holding section 2 is sent to the feature pattern generation section 11-1, projected to, for example, a prescribed 50-dimensional linear subspace, and converted into a 50-dimensional feature pattern (step 103). Here, the predetermined linear subspace is a subspace which has as a base top 50 characteristic vectors obtained by analyzing main components of, for example, an image of multiple given 27×27 pixels, and the projection to the subspace has an effect to compress an amount of information while substantially keeping the vector size.

Then, the feature pattern is input to the auto-encoder and also given as a teacher signal of the auto-encoder at the same time. And, a weight of each synapse is updated by a conventional technique, the back-propagation method to decrease a square error of output of the auto-encoder and the teacher signal so to learn the subspace (step 104). Details of the back-propagation method will not be described in detail here because it is known well. And, the square error of the output of the auto-encoder and the teacher signal is averaged over all learning samples, and learning is continued until its value becomes smaller than the prescribed value (NO in step 105). When the square error becomes smaller than the prescribed value, namely when learning of the subspace converges (YES in step 105), learning of the deformed amount estimation section 13-1 is performed.

In learning of the deformed amount estimation section 13-1, a learning sample is input again (step 106), the learning sample is converted into a feature pattern (step 107), and the feature pattern is input to the auto-encoder to calculate a projection value (step 108). And, output of two neurons of the intermediate layer of the auto-encoder is input to the deformed amount estimation section 13-1, and an angle of rotation applied to generate the learning sample is also input (step 109). As learning of the deformed amount estimation section 13-1, a lookup table of rotation angles to the output of two neurons of the intermediate layer 2 is prepared (step 110). The above processing is performed on all learning samples (NO in step 111), and when the processing of all learning samples is completed (YES in step 111), the learning is terminated.

Here, learning of the respective image-deformed amount estimation sections 5 was independently described but the respective image-deformed amount estimation sections 5 can be related to one another for learning. As a learning method, a learning sample is input to, for example, all the image-deformed amount estimation section 5, and the image-deformed amount estimation section 5 which has obtained the best result (minimum distance) is made to learn, and the same procedure is repeated.

Figure 9:
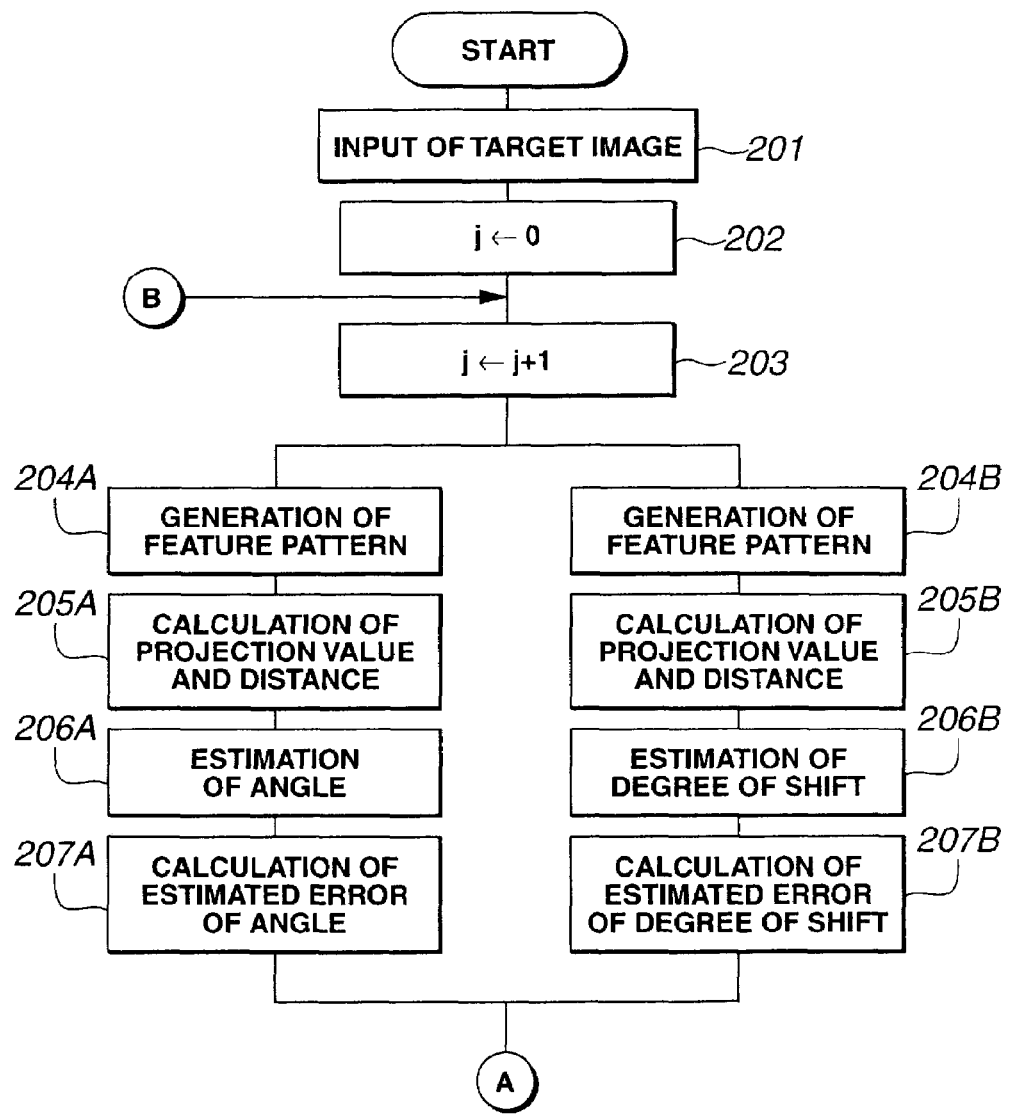
FIG. 9 is a flow chart (1) showing a flow of an operation of the recognition device when it is recognizing.
Figure 10:
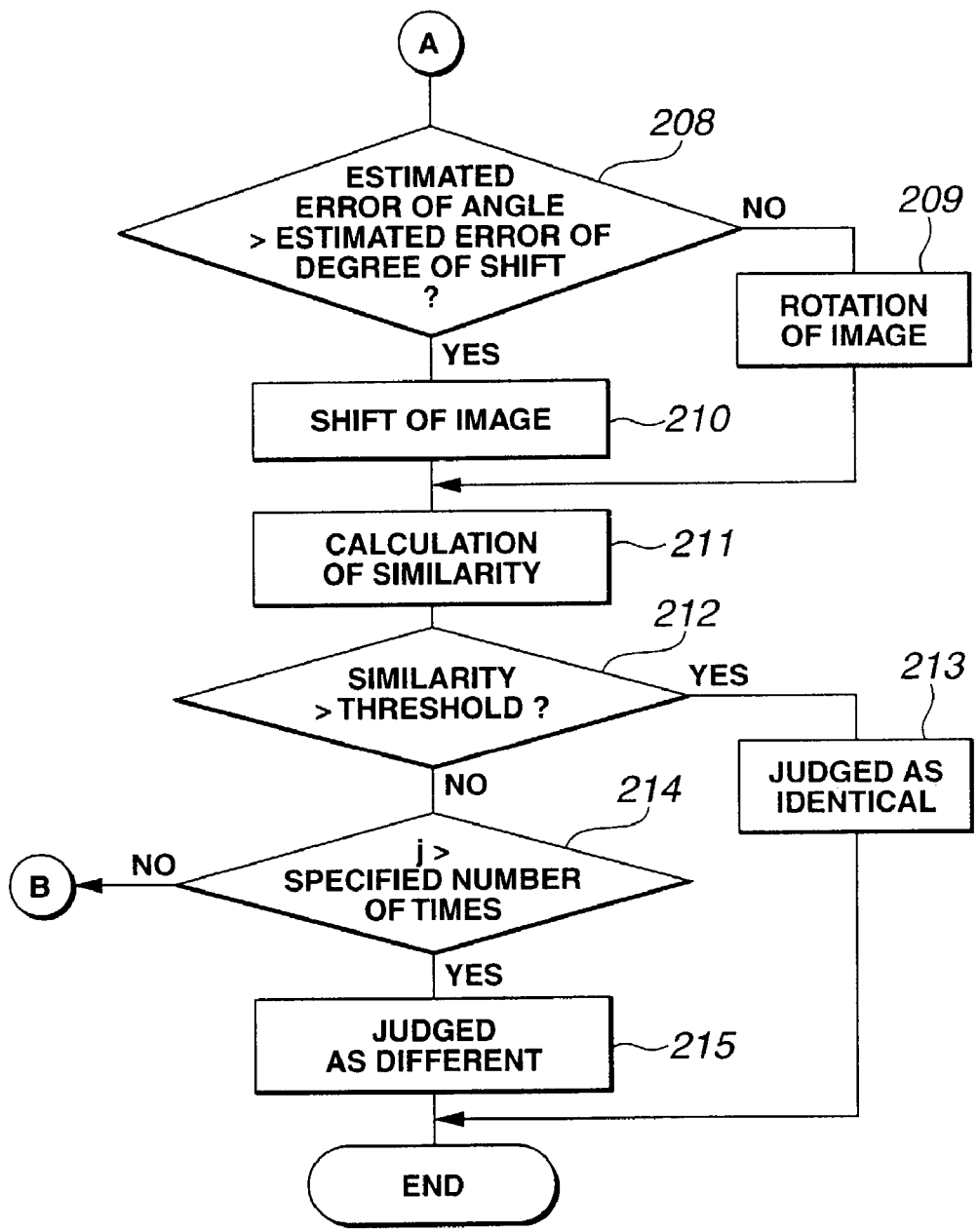
FIG. 10 is a flow chart (2) showing a flow of an operation of the recognition device when it is recognizing.

Then, an operation for recognition by the recognition device shown in FIG. 1 will be described. FIG. 9 and FIG. 10 are flow charts showing a flow of the operation for recognition by the recognition device.

In the recognition processing, first, a target image, e.g., an image of 27×27 pixels, is input to the image input section 1 and held in the form of 729-dimensional vector with the luminance value of each pixel as a component by the image holding section 2 (step 201). Subsequently, a value j of a counter for counting the number of image manipulation times is initialized to 0 (step 202), and the counter value j is increased by one (step 203).

Then, the image held by the image holding section 2 is sent to the first feature pattern generation section 11-1, where it is projected to a predetermined, for example, 50-dimensional linear subspace and transformed into a 50-dimensional feature pattern (step 204A). And, this feature pattern is input to the first subspace projection calculation section 12-1, the projection value of the feature pattern to the subspace and the distance between the feature pattern and the subspace are calculated (step 205A), and the first deformed amount estimation section 13-1 estimates a rotation angle of the image from the projection value of the feature pattern to the subspace (step 206A). And, the first estimated error evaluation section 14-1 calculates an estimated error of the rotation angle from the distance between the feature pattern and the subspace (step 207A).

Meanwhile, in parallel with the processing of the steps 204A to 207A, the image held by the image holding section 2 is sent to the second feature pattern generation section 11-2, where it is projected to a predetermined, e.g., 50-dimensional linear subspace, and transformed into a 50-dimensional feature pattern (step 204B). And, the feature pattern is input to the second subspace projection calculation section 12-2, and a projection value of the feature pattern to the subspace and a distance between the feature pattern and the subspace are calculated (step 205B). The second deformed amount estimation section 13-2 estimates a degree of shift of the image from the projection value of the feature pattern to the subspace (step 206B). And, the second estimated error evaluation section 14-2 calculates an estimated error of the degree of shift from the distance between the feature pattern and the subspace (step 207B).

Then, the image deformation adjustment section 7 compares the estimated error of the rotation angle calculated by the first estimated error evaluation section 14-1 and the estimated error of the degree of shift calculated by the second estimated error evaluation section 14-2. As a result, when the estimated error of the rotation angle is smaller (NO in step 208), by the adjustment made by the image deformation adjustment section 7, the first image deformation section 6-1 rotates the image of the image holding section 2 in a direction to erect the image (step 209). Meanwhile, when the estimated error of the degree of shift is smaller (YES in step 208), by the adjustment made by the image deformation adjustment section 7, the second image deformation section 6-2 shifts the image of the image holding section 2 in a direction to position the image at the center (step 210). At this time, when the estimated value of the rotation angle or the degree of shift is less than the prescribed value (closer to the normalization image), deformation related to the flexibility is not made, and another deformation is made with higher priority.

Then, the similarity calculation section 3 calculates a similarity of the image of the image holding section 2 with the reference image (step 211). And, when the similarity exceeds a prescribed threshold (YES in step 212), it is judged that the input image is identical with the reference (step 213), and the recognition processing is terminated.

Meanwhile, where the similarity is equal to or below the threshold (NO in step 212), if the number of image manipulation times is a prescribed number of times or below, namely the counter value j is a prescribed number of times or below (NO in step 214), the procedure shifts to step 203, and the same processing is performed on the image (already rotated or shifted) of the image holding section 2. If the number of image manipulation times exceeds the prescribed number of times (YES in step 214), it is judged that the input image is different from the reference(step 215), and the recognition processing is terminated.

Figure 11:
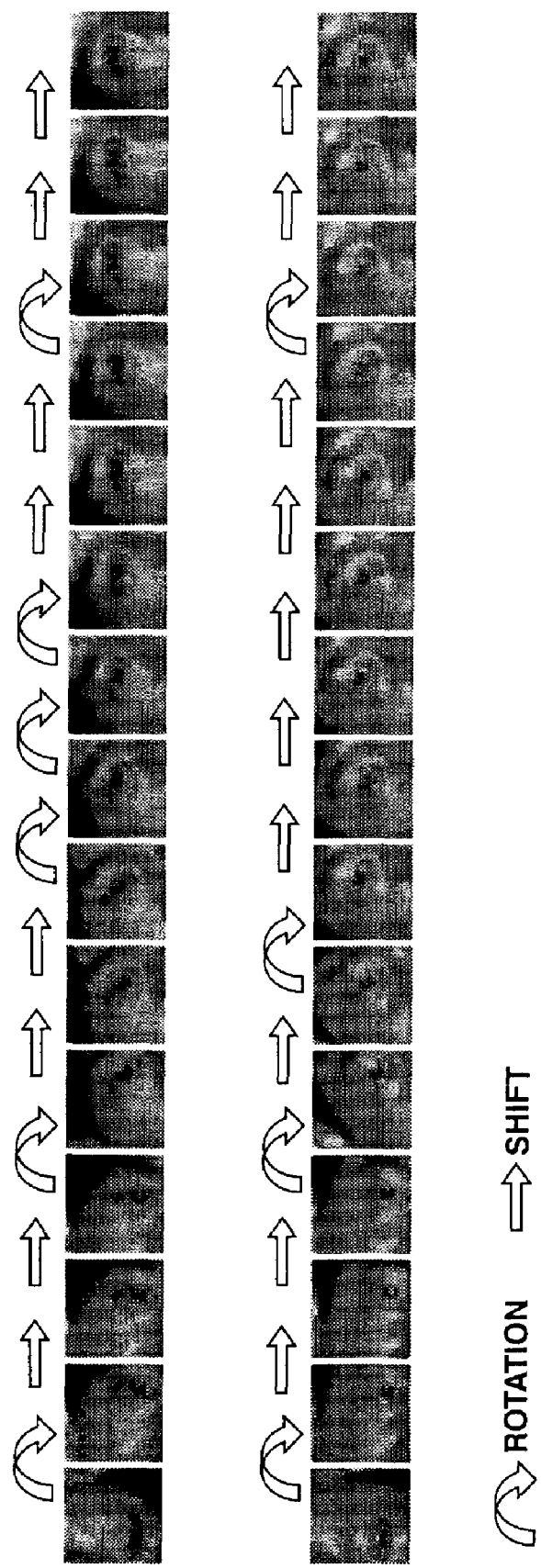
FIG. 11 is a diagram showing a state of changes of an image stored in an image holding section 2.
Figure 12:
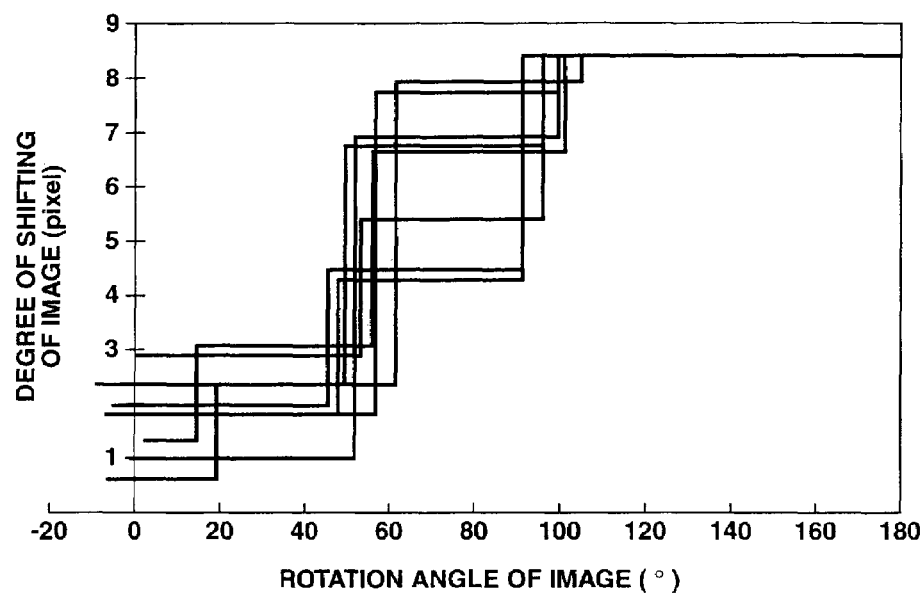
FIG. 12 is a graph showing the changes of image angles and deviations from the center when eight samples are recognized.

FIG. 11 shows a changing state of the image held by the image holding section 2 when the processing described with reference to FIG. 9 and FIG. 10 was performed on two types of images in squares shifted by 6 bits at an angle of −180 degrees and in vertical and horizontal directions. And, FIG. 12 is a graph showing an angle of the image and the progression of a deviation from the center when the same recognition processing is performed on eight samples. It is seen from the respective drawings that by inputting, the image positioned upright at the center is obtained by several operations by repeating the rotation and shifting of the image.

There were two image deformation sections 5 in the above description, but the same procedure can be used for recognition processing even if there are three or more of them. For the flexibility of image deformation, any deformation to indicate facial expressions, difference among individuals can be made other than the deformation caused by rotation in a depth direction and a change in lighting.

And, a cumulative value of deformed amounts can be used to show a deviation from the normalized state of the target, and the state of the target positioned can also be recognized.

According to the embodiment described above, even when the environment for the target changes largely, the image recognition device which can recognize the target can be realized with a realistic resource, and learning can be made with ease by using a small number of learning samples.

Embodiment 2

The recognition device of Embodiment 2 has the same structure as that in Embodiment 1 shown in FIG. 1, and only the processing by the subspace projection calculation section 12, the deformed amount estimation section 13 and the estimated error evaluation section 14 is different. Therefore, only the processing made by the subspace projection calculation section 12, the deformed amount estimation section 13 and the estimated error evaluation section 14 will be described, and other structures will not be described here.

The subspace projection calculation section 12 has learned the subspace which approximates the distribution of the feature pattern of the reference image. Because a change in the feature vector in a real world is very complex, a nonlinear subspace is preferable to approximate the change. But, instead of learning the nonlinear subspace in the space indicating the feature pattern, Embodiment 2 maps the feature pattern in a higher dimensional space than in the feature pattern space by the predetermined nonlinear mapping and approximately expresses the nonlinear subspace of the feature pattern space by the linear subspace in the mapped high dimensional space.

And, when the feature pattern of the subject image is input, the subspace projection calculation section 12 maps the feature pattern to the high dimensional space by nonlinear mapping, projects to the linear subspace in the high dimensional space, and outputs coordinate values of the coordinate system of the projection on the linear subspace. Here, the projection vector is defined as a point on the linear subspace where the distance becomes closest to the nonlinear mapping of the feature pattern. At the same time, the distance between the nonlinear mapping of the feature pattern and the linear subspace is calculated and output.

Now, the above-described method to determine the distance between the projection value and subspace will be described in detail. When it is assumed that the feature pattern is d-dimensional vector x and the nonlinear mapping to map x in a dΦ-dimensional high dimensional space F is Φ, Expression (1) is established.

$$\Phi: R^d \mapsto F, x \mapsto \Phi(x) = (\phi_1(x), \ldots, \phi_1(x))^T \quad (1)$$

The m-dimensional linear subspace of the high dimensional space is determined by learning in advance, and when its base vector is assumed to be Φ1, ... Φm, projection values α1, ..., αm of the nonlinear mapping of the feature pattern to the linear subspace is determined as α1, ..., αm which minimize the distance L between the nonlinear mapping of the feature pattern and the point on the linear subspace as indicated by Expression (2). And, the square root of the value L at that time becomes a distance between the nonlinear mapping of the feature pattern and the linear subspace.

$$L = \left(\Phi(x) - \sum_{i=1}^{m} \alpha_i \Phi_i\right) \cdot \left(\Phi(x) - \sum_{i=1}^{m} \alpha_i \Phi_i\right) \quad (2)$$

However, to generally express strong nonlinearity in a feature pattern space, the number of dimensions of high dimensional space becomes very high, and it is substantially impossible to calculate Expression (2). Therefore, this embodiment selects special mapping as the nonlinear mapping Φ to make it possible to use a technique which is called a kernel method, and makes it possible to calculate Expression (2) by a realistic computational quantity. Specifically, the nonlinear mapping Φ is selected so to relate to a predetermined kernel function. Here, the kernel function is a function which is defined by the feature pattern space indicated by Expression (3), and $\phi_1(x), \ldots, \phi_{d\Phi}(x)$ are called a characteristic function of the kernel function, and $\lambda_1, \ldots, \lambda_{d\Phi}$ are called its characteristic value.

$$K(x, y) = \sum_{i=1}^{d_\Phi} \lambda_i \phi_i(x) \cdot \phi_i(y) \quad (3)$$

As the kernel function, the Gaussian kernel shown by Expression (4) and polynominal kernel shown by Expression (5) can be used.

$$K(x,y) = \exp(-\|x-y\|^2/(2\sigma^2)) \quad (4)$$

$$K(x,y) = (1+x \cdot y)^d \quad (5)$$

The selected nonlinear mapping Φ is expressed as indicated by Expression (6) by using a characteristic function and a characteristic value. Besides, the linear subspace is restricted so that m base vectors of the linear subspace of the high-dimensional space become vectors of nonlinear mapping $\Phi(x1), \ldots, \Phi(xn)$ of any m vectors $x1, \ldots, xm$ (hereinafter referred to as a preimage) of the d-dimensional feature pattern space.

$$x=(x_1, \ldots x_d) \to \Phi(x)=(\sqrt{\lambda_1}\phi_1(x), \ldots, \sqrt{\lambda_{d\Phi}}\phi_{d\Phi}(x)) \quad (6)$$

When the relation of Expression (3) is used, Expression (2) becomes Expression (7) by using the kernel function. Expression (7) does not contain vector calculation of the high dimensional space explicitly, so that calculation can be made with ease. And, $\alpha1, \ldots, \alpha m$ which make the Expression (7) minimum are determined as $\alpha1, \ldots, \alpha m$ which make differential of L zero and expressed as indicated by Expression (8). Here, matrix K is a matrix which has K(xi, xj) as i row and j column components. And, the minimum value L is determined by substituting $\alpha1, \ldots, \alpha m$ into Expression (7).

$$L = K(x, x) - 2\sum_{i=1}^{m} \alpha_i K(x, x_i) + \sum_{i=1}^{m}\sum_{j=1}^{m} \alpha_i \alpha_j K(x_i, x_j) \quad (7)$$

$$\alpha_i = \sum_{j=1}^{m} K_{ij}^{-1}(x, x_j) \quad (8)$$

Then, a learning rule of the base vector of the linear subspace will be described. Because the base vector of the linear subspace is assumed having a preimage without fail, the learning rule becomes a learning rule of not the base vector itself but of the preimage. The learning rule of the preimage determines the projection values $\alpha1, \ldots, \alpha m$ and then moves a preimage xi in direction $\Delta xi$ to decrease Expression (7) most. The $\Delta xi$ is obtained by a so-called steepest descent method and expressed by Expression (9) below.

$$\Delta x_i = -\eta \alpha_i (G(x))^{-1} \cdot \left( \frac{\partial}{\partial x_i} K(x, x_i) - \sum_{j=1}^{m} \alpha_j \frac{\partial}{\partial x_i} K(x_i, x_j) \right) \quad (9)$$

Here, $\eta$ is a learning coefficient, which is a positive constant. G(x) is variety of metric tensors which are embedded in the high dimensional space by nonlinear mapping, the metric tensor in Expression (9) has meaning to correct a direction of the steepest inclination in the high dimensional space to a direction of the steepest inclination in the feature pattern space. G(x) can also be expressed by Expression (10) by using the kernel function. By Expression (10), because it is basically a linear optimization problem in the high dimensional space, learning can be made in a short time with good convergence different from the nonlinear optimization.

$$g_{ab}(x)=(\partial/\partial x^a)\cdot(\partial/\partial x^b) K(x, x')|_{x=x'} \quad (10)$$

Figure 13:
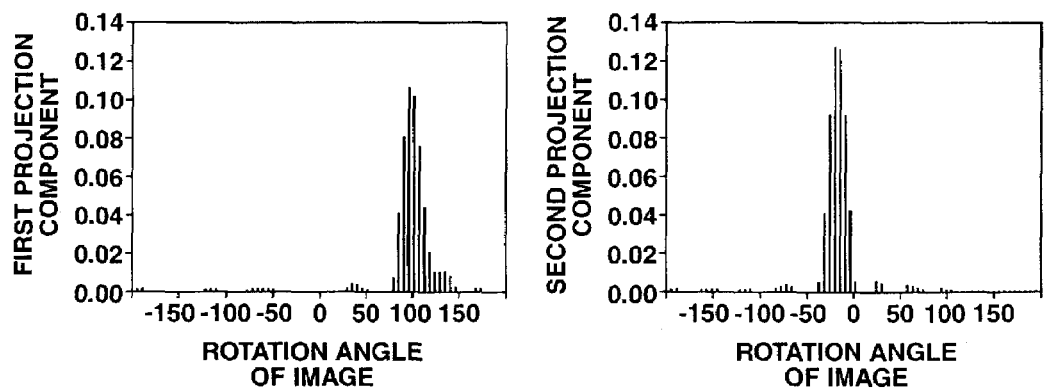
FIG. 13 shows diagrams of relationships between particular projection values and rotation angles of images in Embodiment 2.

Then, the deformed amount estimation section 13 will be described. The deformed amount estimation section 13 has previously learned the relationship between the image-deformed amount and the projection to the subspace of the feature vector output from the subspace projection calculation section 12, and it is used to determine and output the image-deformed amount from the projection value to the subspace. The relationship between the projection to the subspace and the image-deformed amount is as shown in FIG. 13 when the flexibility is rotation for example. In FIG. 13, a given projection component was plotted with respect to the angle of the target, but each component is most reactive to a particular angle, and the reaction becomes weak as the angle varies. A combination of base number i and image-deformed amount $\theta(i)$ which makes the projection component to its base maximum is stored as a lookup table in the deformed amount estimation section 13. And, the image-deformed amount is determined as Expression (11) by making, for example, weighted means of the values $\theta(i)$ by using input $\alpha1, \ldots, \alpha m$ from the subspace projection calculation section 12.

$$\vartheta = \frac{\sum_{i=1}^{m} \alpha_i \theta(i)}{\sum_{i=1}^{m} \alpha_i} \quad (11)$$

The estimated error evaluation unit 14 calculates L which is the square of the distance between the nonlinear mapping and the linear subspace of the feature pattern by Expression (7) and outputs as precision of the image-deformed amount estimated by the deformed amount estimation section 13. Because it is considered that the feature pattern can be approximated well as L is smaller, it is appropriate to use L as precision of the image-deformed amount. It is to be understood that any monotone increasing function related to L can be used.

Because the sample, a learning procedure of the recognition device and recognition procedure required for learning in Embodiment 2 are the same as in Embodiment 1, descriptions about them are omitted.

Embodiment 3

In Embodiment 3, a particular voice, for example, "a" is recognized instead of an image. The recognition device of Embodiment 3 has the same structure as that of Embodiment 1 shown in FIG. 1 except that the "image" is replaced by "voice".

Figure 14:
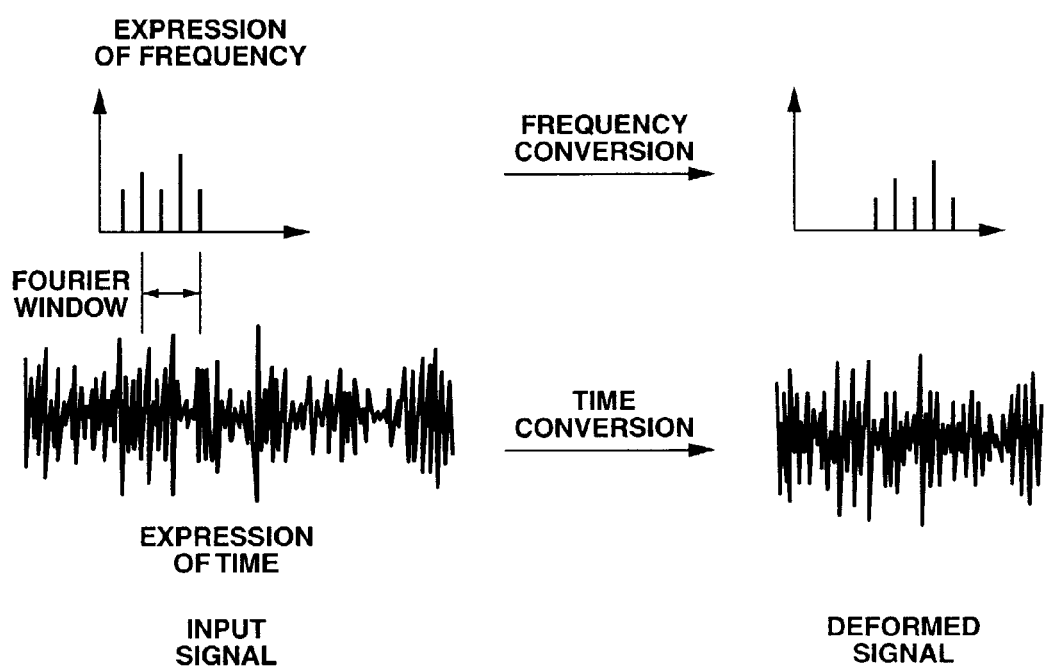
FIG. 14 shows diagrams of a method of changing input voices in Embodiment 3.

Therefore, the structure of Embodiment 3 will not be described here. Because differences from Embodiment 1 are an input pattern expression method and an input pattern deformation method, they will be described with reference to FIG. 14. Input voices are sampled at prescribed time intervals and held as a discrete expression with time and two frequency expressions which are Fourier-transformed in a time region designated by a Fourier window. Embodiment 3 has two pattern deformation sections and their corresponding patterns deformed amount estimation sections for the held input. The first pattern deformation section changes the frequency expression to shift the frequency. Meanwhile, the second pattern deformation section changes the time expression and elongates the pattern in a direction of time axis. By having the above two pattern deformation sections, they can deal with a change in height of voices produced and a change in produced speed.

Because learning and recognition procedures are the same as in Embodiment 1, their descriptions are omitted.

In the above-described embodiments, the input of images and voices was described, but the input is not limited to them. Any type of information expressible as feature patterns such as taste, sense of smell, and sense of touch can be applied. For an image, colors can be used for judgment, for the voice, words can be used for judgment, and sounds produced by a musical instrument can be used for judgment.

What is claimed is:

1. A recognition device which judges whether a target is identical with a predetermined reference, comprising:
 a holding means which holds the target;
 multiple deformation sections which deform the target held by the holding means with at least one degree of flexibility in deformation;
 multiple deformed amount estimation means which correspond to the deformation sections in a one-to-one relationship and estimate a deformed amount of the target from the reference with respect to the flexibility in deformation according to the corresponding deformation sections;
 an estimated error evaluation means which evaluates an estimated error of the deformed amount estimated by the deformed amount estimation means, wherein the estimated error corresponds to the amount of image operation performed on an image;
 an adjustment means which operates any of the deformation sections with precedence according to the estimated error evaluated by the estimated error evaluation means, in order from a smaller to a larger estimated error;
 a similarity calculation means which calculates a similarity between the reference and the target which is deformed by the deformation sections operated with precedence by the adjustment means; and
 a judgment means which judges whether the target is identical with the reference according to the similarity calculated by the similarity calculation means.

2. The recognition device according to claim 1, wherein:
 the holding means holds the target deformed by the deformation sections; and
 the deformation sections, the deformed amount estimation means, the estimated error evaluation means and the adjustment means repeatedly deform the target when it is judged by the judgment means that the target held by the holding means is not identical with the reference.

3. The recognition device according to claim 1, wherein:
 the multiple deformed amount estimation means have a subspace learned so as to approximate a distribution of a predetermined learning model, determine a point for the target on the subspace closest to the target, and indicate the deformed amount by coordinates on the subspace indicating the determined point; and
 the estimated error evaluation means indicates the estimated error by a distance between the target and the subspace.

4. The recognition device according to claim 3, wherein a value of coordinates on the subspace corresponds to the deformed amount in a one-to-one relationship.

5. The recognition device according to claim 3, wherein:
 a particular coordinate axis on the subspace corresponds to a particular value of the deformed amount in a one-to-one relationship, and
 the deformed amount estimation means determines the deformed amount by assigning weights to the particular value by corresponding coordinate values.

6. A recognition device which judges whether a target is identical with a predetermined reference, comprising:
 a holding means which holds the target;
 multiple deformation means which deform the target held by the holding means with at least one degree of flexibility in deformation;
 multiple deformed amount estimation means which correspond to the deformation means in a one-to-one relationship and estimate a deformed amount of the target from the reference with respect to the flexibility in deformation according to the corresponding deformation means, and the multiple deformed amount estimation means have a subspace learned so as to approximate a distribution of a predetermined learning model, determine a point for the target on the subspace closest to the target, and indicate the deformed amount by coordinates on the subspace indicating the determined point;
 an estimated error evaluation means which evaluates an estimated error of the deformed amount estimated by the deformed amount estimation means, and indicates the estimated error by a distance between the target and the subspace;
 an adjustment means which operates any of the deformation means with precedence according to the estimated error evaluated by the estimated error evaluation means;
 a similarity calculation means which calculates a similarity between the reference and the target which is deformed by the deformation means operated with precedence by the adjustment means; and
 a judgment means which judges whether the target is identical with the reference according to the similarity calculated by the similarity calculation means,
 wherein the deformed amount estimation means learns the subspace by an identical mapping neural network, indicates the coordinates of the point on the subspace closest to the target by an output value of an intermediate layer of the neural network to the target and indicates a distance between the subspace and the point indicating the target by a difference between the input and output of the neural network.

7. The recognition device according to claim 3, wherein the deformed amount estimation means maps the learning model to a dimensional space that is higher than the dimensional space of the learning model by nonlinear calculation, and indicates the subspace as a linear subspace of the high dimensional space.

8. The recognition device according to claim 7, wherein the nonlinear calculation is determined by a particular kernel function, a base vector of the subspace is restricted to be nonlinear calculation of a particular target, and the coordinates on the subspace and a distance between the target and the subspace are indicated by the kernel function.

9. The recognition device according to claim 1, wherein the deformed amount estimation means learn by using multiple learning models generated by deforming the reference by at least one of the deformation sections.

10. The recognition device according to claim 1, wherein the deformed amount estimation means learn independently from one another.

11. The recognition device according to claim 1, wherein the deformed amount estimation means learn in competition at the same time.

12. The recognition device according to claim 1, wherein the target and the reference are images.

13. The recognition device according to claim 1, wherein the target and the reference are voices.

14. A recognition method for determining whether a target is identical with a predetermined reference, comprising:
 estimating a deformed amount of the target from the reference according to multiple degrees of freedom for deformation;

evaluating an estimated error of the estimated amount, wherein the estimated error corresponds to the amount of image operation performed on an image;

deforming the target, via multiple deformation sections, with the degree of freedom for deformation starting at the evaluated estimated error from the smaller to the larger error level;

calculating a similarity between the deformed target and the reference; and judging whether the target is identical with the reference according to the calculated similarity.

15. The recognition method according to claim 14, wherein, when it is judged that the target is not identical with the reference, the target is deformed repeatedly.

16. The recognition method according to claim 14, wherein:

the deformed amount is indicated by coordinates on the subspace showing a point which is determined for the target on the subspace closest to the target by using the subspace learned so to approximate a distribution of a predetermined learning model; and the estimated error is evaluated by the distance between the target and the subspace.

17. The recognition method according to claim 14, wherein, when the similarity is equal to or larger than a predetermined value, the target and the reference are determined to be identical, and a state of the target is recognized from the cumulative value of the deformed amounts of the image.

18. The recognition method according to claim 14, wherein the target and the reference are images.

19. The recognition method according to claim 14, wherein the target and the reference are voices.

20. The recognition device according to claim 1, wherein a degree of the deformed amount is determined to be a value obtained by multiplying the estimate of the deformed amount by a deceleration factor.

* * * * *